Feb. 1, 1955 J. F. DAUKUS 2,701,014
TUBE AND PIPE SHEARING MECHANISM
Filed Oct. 18, 1949 7 Sheets-Sheet 3
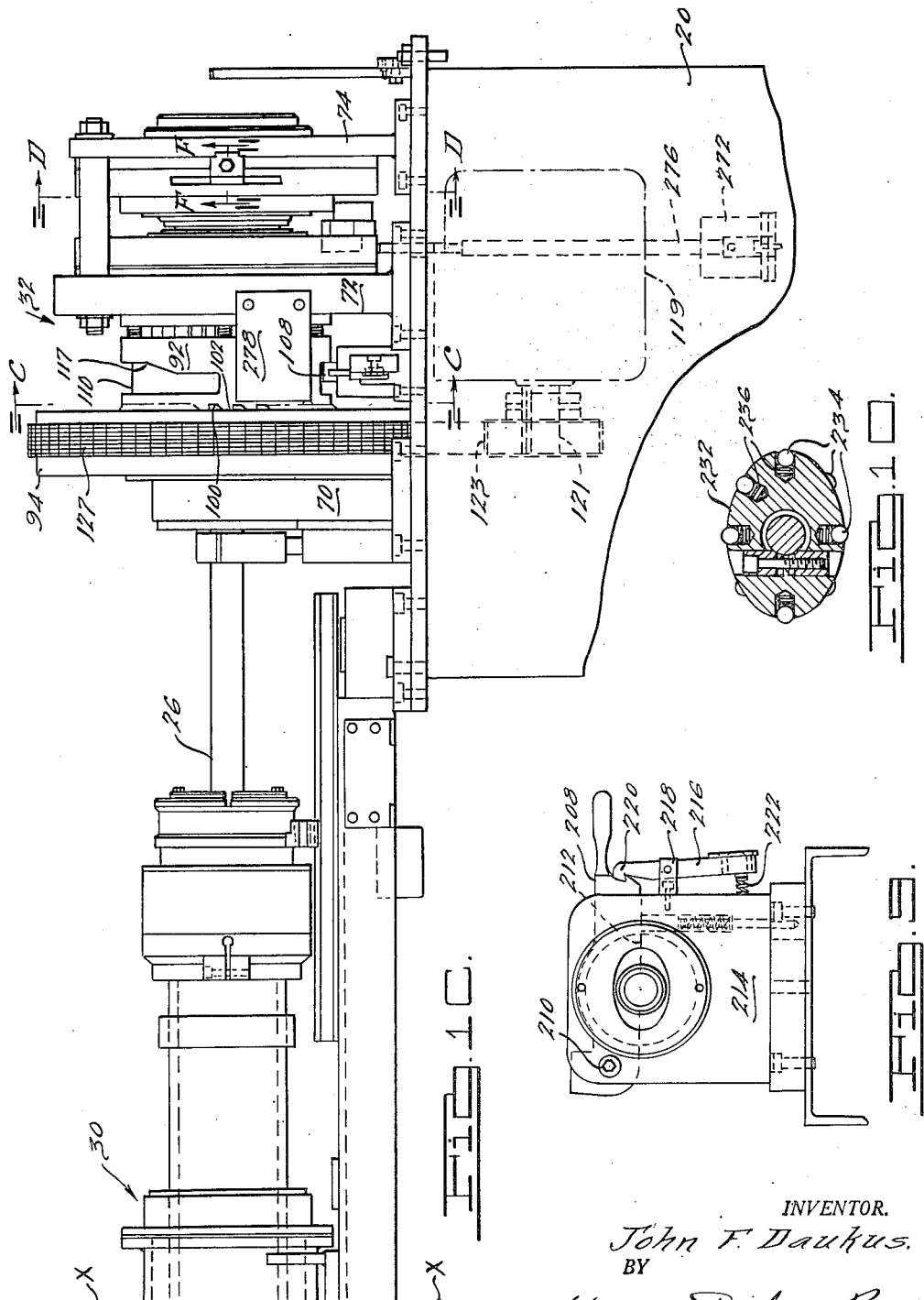
INVENTOR.
John F. Daukus.
BY
Harness, Dickey & Pierce
ATTORNEYS.

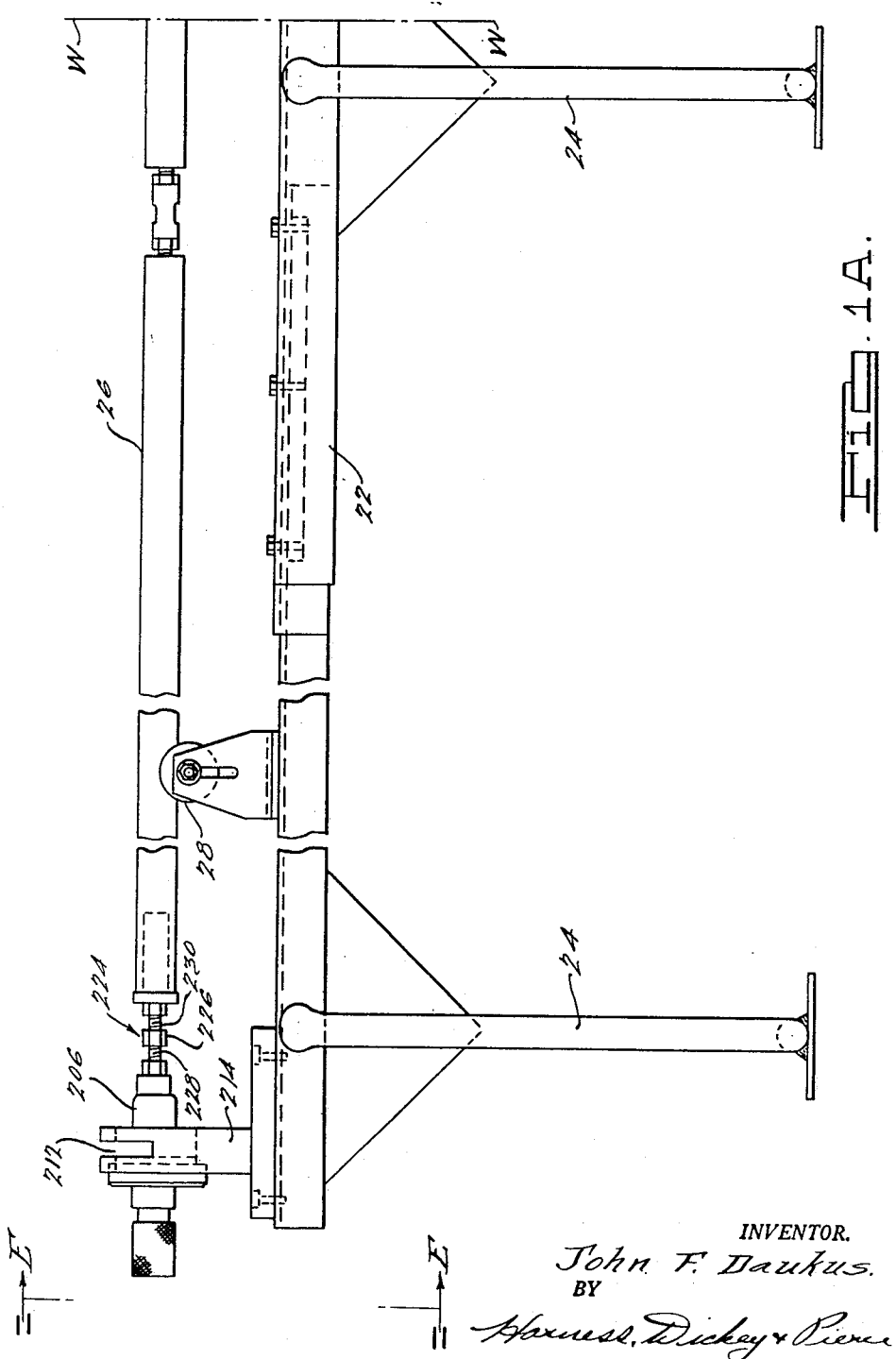

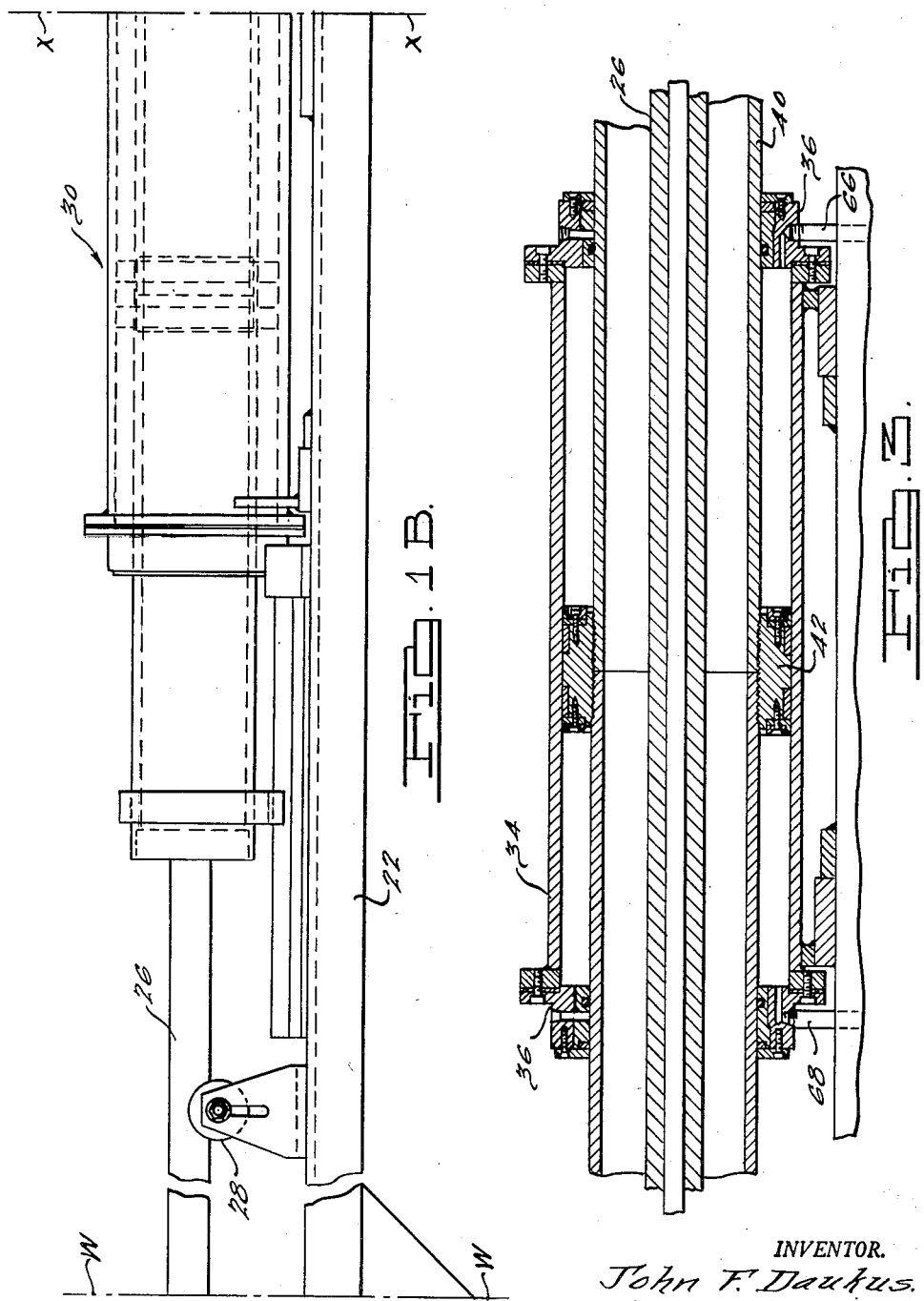

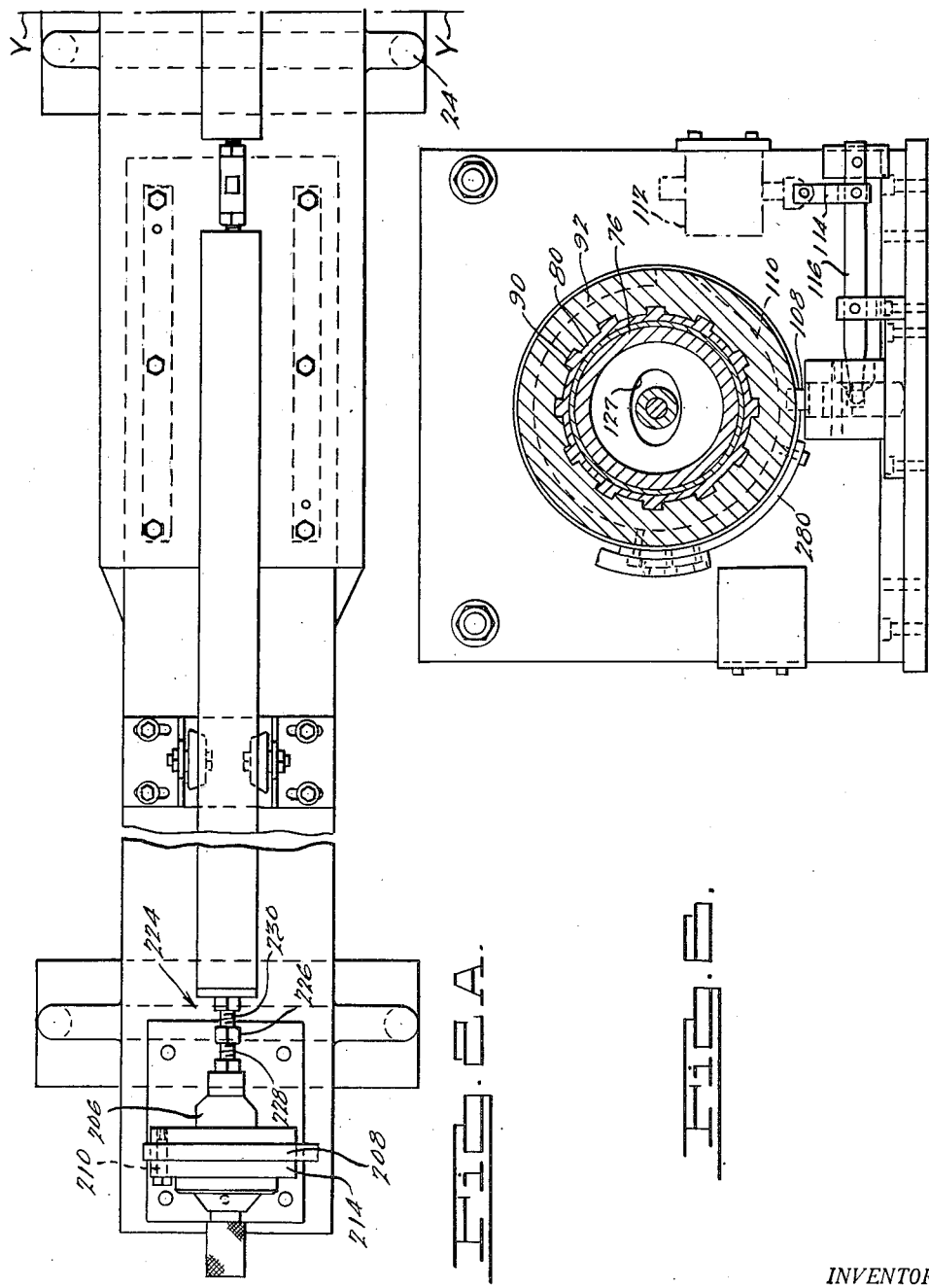

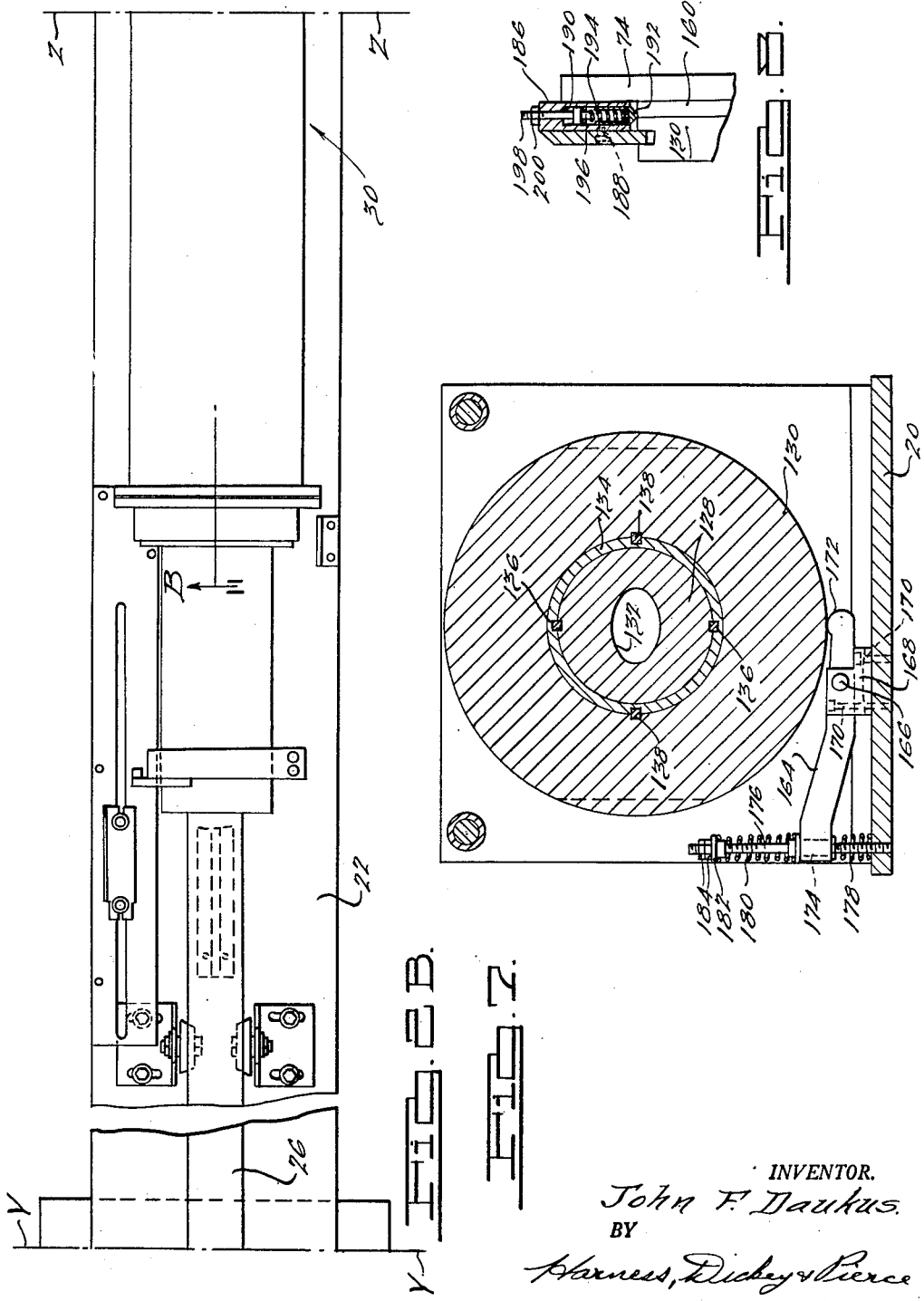

Feb. 1, 1955 J. F. DAUKUS 2,701,014
TUBE AND PIPE SHEARING MECHANISM
Filed Oct. 18. 1949 7 Sheets-Sheet 6
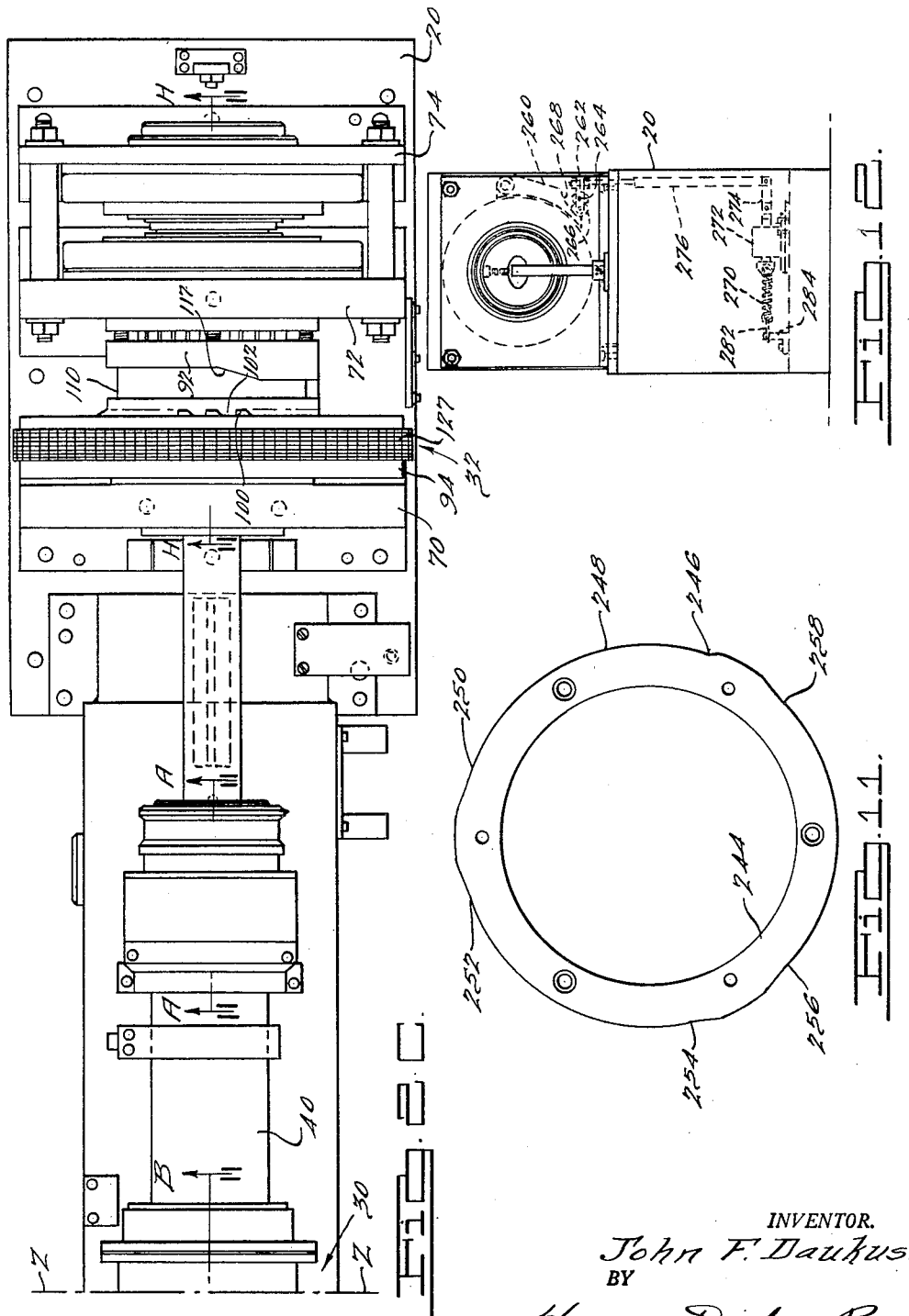
INVENTOR.
John F. Daukus.
BY
Harness, Dickey & Pierce
ATTORNEYS.

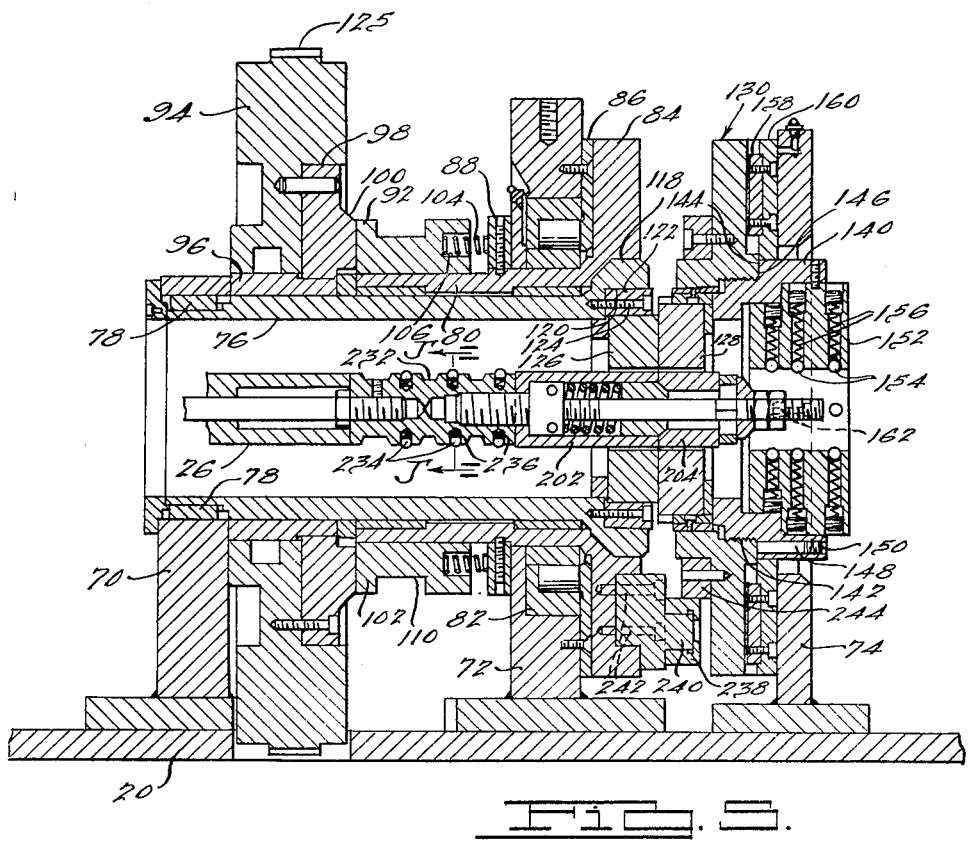
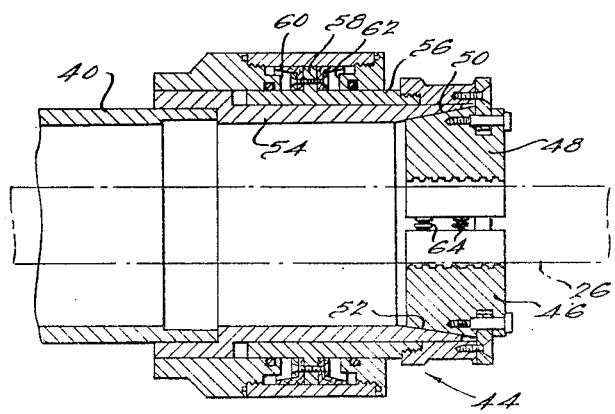

United States Patent Office 2,701,014
Patented Feb. 1, 1955

2,701,014

TUBE AND PIPE SHEARING MECHANISM

John F. Daukus, Detroit, Mich., assignor to J. Edgar Duncan, Detroit, Mich.

Application October 18, 1949, Serial No. 122,010

10 Claims. (Cl. 164—40)

The present invention relates to an improved tube and pipe shearing mechanism.

It is an object of the invention to provide a pipe shearing mechanism giving greatly improved cuts which do not result in burrs.

Another object is to provide a tube shearing mechanism which has a novel cutting action and by means of which tube sections may be finish cut and need not be deburred.

A further object of the invention is to provide a shearing mechanism in which a movable die is moved from a position of alignment with a stationary die and in a direction substantially radially of said stationary die for a distance sufficient to partially shear through the wall of a tube received in said mechanism but not completely cut off the tubing after which it is returned to a position of substantial alignment with the stationary die and subsequently is moved in another direction, also substantially radially of the stationary die, for a distance sufficient to complete the shearing of the tube.

It is also an object of the present invention to generally improve the construction and operation of tube shearing mechanisms of the above identified type.

Other and more detailed objects of the invention will become apparent from a consideration of the following specification, the appended claims and the accompanying drawings throughout the several views of which like reference characters designate like parts and wherein:

Figure 1 is a side elevational view in three segments, Fig. 1A, Fig. 1B and Fig. 1C, of a tube shearing mechanism embodying the invention, Fig. 1A showing one end of the mechanism to the line W—W, Fig. 1B showing the mechanism from the line W—W to the line X—X, and Fig. 1C showing the mechanism from the line X—X to the other end;

Fig. 2 is a plan view also in three segments, Fig. 2A, Fig. 2B, and Fig. 2C, of the mechanism illustrated in Fig. 1, Fig. 2A showing the mechanism from one end to the line Y—Y, Fig. 2B showing the mechanism from the line Y—Y to the line Z—Z, and Fig. 2C showing the mechanism from the line Z—Z to the other end;

Fig. 3 is an enlarged broken sectional view of the mechanism illustrated in Fig. 2 taken along the line B—B thereof;

Fig. 4 is an enlarged broken sectional view of the mechanism illustrated in Fig. 2 taken along the line A—A thereof;

Fig. 5 is an enlarged broken sectional view of the mechanism illustrated in Fig. 2 taken along the line H—H thereof;

Fig. 6 is an enlarged sectional view of the mechanism illustrated in Fig. 1 taken along the line C—C thereof;

Fig. 7 is an enlarged sectional view of the mechanism illustrated in Fig. 1 taken along the line D—D thereof.

Fig. 8 is an enlarged sectional view of the mechanism illustrated in Fig. 1 taken along the line F—F thereof;

Fig. 9 is an enlarged end view taken from the line E—E of Fig. 1;

Fig. 10 is an enlarged sectional view of the mechanism illustrated in Fig. 5 taken along the line J—J thereof;

Fig. 11 is an elevational view of the cam ring; and,

Fig. 12 is a right hand end elevational view of the mechanism illustrated in Figure 1.

The reference characters referred to herein are those which are not encircled on the drawings.

It will be appreciated from a complete understanding of the present invention that the improvements thereof may be readily embodied in a machine for shearing pipe or tubing of any size and shape. In the preferred embodiment illustrated and described, the mechanism is adapted for shearing oval tubing.

Referring to the drawings, the tube shearing mechanism comprises a base 20, an elongated tube support frame 22 connected at one end to the base 20 and supported on spaced legs 24. An elongated mandrel 26 adapted to receive the pipe to be cut is supported above the frame 22 on longitudinally spaced roller supports 28 and extends through a feeding mechanism generally indicated at 30 for indexing the tube along the mandrel 26 between cutting operations. The mandrel 26 also extends through a shearing mechanism generally indicated at 32 and mounted on the base 20.

Referring to Figures 1, 2 and 3, the feeding mechanism comprises a hollow pneumatic cylinder 34, the opposite ends 36 and 38 of which are sealed to a hollow cylindrical piston rod 40 carrying a piston 42 sealingly engaging the inner wall of the cylinder 34. At its forward or right hand end, as viewed in Figures 1 and 2, the piston rod 40 carries the tube gripping mechanism 44 (see Fig. 4) the jaw elements 46 and 48 of which are cammed into engagement with a tube on the mandrel 26 during movement of the piston rod 26 to the right as viewed in the drawings, by the cooperating engagement of the cam surfaces 50 and 52 formed respectively on the jaw elements 48 and a sleeve element 54 secured to the forward or right hand end of the piston rod 40. The jaws 48 are carried on a sleeve 56 slidably fitting over the sleeve 54. Axial movement of the sleeve 56 relative to the sleeve 54 is limited by an annular flange 58 on the sleeve 56 adapted to engage positive stops 60 and 62 fixedly carried by the sleeve 54. The jaws 48 are yieldably urged toward their released position by springs 64. Reciprocation of the piston 42 in the cylinder 34 is effected by air selectively supplied to the cylinder 34 through suitable lines 66 and 68 (see Fig. 3) from a suitable supply of air under pressure through conventional valve means controlled by conventional limit switches positioned to provide the desired length of feed of the tube for each stroke of the piston 40.

The shearing mechanism 32 comprises three transversely extending vertically disposed and longitudinally spaced supporting plates 70, 72 and 74 (see Figs. 1, 2 and 5). A stationary tubular shaft 76 is supported on the plates 70 and 72 in coaxial relation with the mandrel 26 and receives the latter therethrough. The shaft 76 has a keyed engagement with the plate 70, as at 78, and is supported at the plate 72 in a sleeve 80 rotatably fitting over the shaft 76 and rotatably supported in the plate 72 by means of bearing element 82. Intermediate the plates 72 and 74, the sleeve 80 has a disk portion 84 integrally formed thereon and rides against a thrust bearing ring 86 secured to the adjacent face of the plate 72. At the opposite side of the plate 72 an annular spring support 88 is secured to the sleeve 80 for rotation therewith. Intermediate the spring support 88 and the left hand end, as viewed in Fig. 5, of the sleeve 80, the outer surface of the latter is splined as at 90 (see Fig. 6) for driving engagement with an internally splined clutch member 92.

Intermediate the left hand end of the sleeve 80 and the plate 70, a flywheel 94 having a central bushing 96 is journaled on the shaft 76. A driving ring 98 is secured in a recess in the right hand face of the flywheel 94, as viewed in Fig. 5, and has integrally formed axially facing teeth 100 adapted to drivingly engage similar teeth 102 integrally formed on the adjacent end surface of the clutch member 92. A plurality of springs 104 seated in recesses 106 in the right hand (see Fig. 5) end of the clutch member 92 act against the spring support ring 88 to urge the clutch member 92 toward the left to move the teeth 102 into engagement with the teeth 100 of the flywheel ring 98. Between cutting operations the clutch member 92 is held with the teeth 102 thereof out of engagement with the teeth 100 by a clutch pin 108 supported on the base 20 and extending into a groove 110 formed in the outer cylindrical surface of the clutch member 92 (see Figs. 1, 2, 5 and 6). The clutch pin 108 is yieldably urged into the groove 110 by suitable means mounted in the housing indicated at 112 (see Fig. 6) and connected to the pin 108 by the link 114 and the lever 116.

Also within the housing 112 is suitable means such as a solenoid (not shown) for withdrawing the clutch pin 108 from the groove 110. The right hand edge of the groove 110 defines a cam surface 117 best illustrated in Figs. 1 and 2 and adapted upon engagement thereof with the pin 108 to disengage the clutch 92 from the flywheel 94.

The flywheel 94 is driven from a motor 119 mounted in the base 20 and the drive shaft 121 of which carries a gear 123 drivingly connected to a gear 125 integrally formed on the flywheel by a chain 127.

At its right hand end the shaft 76 has an enlarged portion 118 (see Fig. 5) having an axially inwardly extending recess 120 in which is received a die holder 122 secured to the shaft 76 by screws 124 and carrying a stationary external die 126 having an aperture 127 (see Fig. 6) adapted to receive oval tubing therethrough. The die 126 may have a press fit in the holder 122 or be otherwise suitably held against rotation relative thereto.

A movable external die 128 is supported for movement in a vertical transverse plane and yieldably held in a position of alignment with the stationary external die 126 in a manner which will now be described with reference to Figures 1, 5, 7 and 8. The die 128 is mounted in an annular die holder 130 for axial movement relative thereto and has an aperture 132 (see Figure 7) corresponding to the aperture 127 of the die 126. The die 128 is held against rotation relative to the holder 130 by a sleeve 134 to which it is connected by keys 136, the sleeve being in turn connected to the holder 130 by keys 138 (see Figure 7). The die 128 is adjusted axially of the holder 130 by an adjusting ring 140 having a threaded engagement at 142 with the die holder 130. The ring 140 has an annular shoulder 144 which engages an outwardly facing shoulder 146 on the holder 130 when the ring 140 is at the inner limit of its adjustment (as illustrated in Figure 5). The ring 140 carries pins 148 adapted to project through the shoulder to an extent which may be adjusted by the set screws 150, and engage the shoulder 146 of the holder to limit inward movement of the adjusting ring 140. In its outer portion the ring 140 carries a tube support adapted to support the portion of a tube projecting outwardly of the dies between a plurality of balls 154 urged inwardly by springs 156.

The die holder 130 has keyed connection indicated at 158 to an intermediate plate 160 which is in turn keyed in a plane at right angles to the sectional view, Fig. 5, to the plate 74, such keyed connection being indicated at 162 in Fig. 5. It will be appreciated that the keys 158 permit vertical movement of the holder 130 relative to the plate 160 and that the keys 162 permit horizontal movement of the plate 160 relative to the plate 74. Accordingly, the combined effect of the keys 158 and 162 and the plate 160 is to prevent rotation of the holder 130 relative to the plate 74 while permitting it to be moved in a vertical plane in any direction relative thereto, and accordingly relative to the stationary die 126.

Referring to Figure 7 the die holder 130 is yieldably supported in a position in which the die 128 is aligned with die 126 by a lever 164 which is pivotally mounted by a pivot pin 166 in a bracket 168 secured to the base 20 below the die holder 130 by screws 170. One end of the lever 164 is rounded, as indicated at 172, and supportingly engages the low-point of the die holder 130. The other end of the lever 164 defines an opening 174 through which extends a stud 176 supported in and projecting upwardly from the base 20. The apertured end of the lever 164 is positioned between lower and upper springs 178 and 180 respectively which encircle the stud 176, the lower spring acting against the base 20 and the underside of the lever 164 and the upper spring acting against the upper side of the arm 164 and a spring abutment 182 on the stud 176 and adjustable therealong by means of cooperating locking nuts 184. It will be appreciated that the weight of the die holder 130 and the other parts carried thereby will hold the die holder down against the end 172 of the lever 164.

The die holder 130 is yieldably held against movement away from and is returned to the above-described position of alignment relative to die 126 by the construction illustrated in Figures 1 and 8, and which comprises a pair of housings 186 secured to the plate 74 at the opposite sides of the holder 130 and at the vertical midpoint thereof by through bolts 188. The housings 186 define recesses 190 in which are mounted plungers 192 projecting outwardly therefrom and engaging the adjacent edge of the intermediate plate 160. The plungers 192 are urged against the intermediate plate 160 by springs 194 disposed within the housings 186 and acting against spring abutments 196 the positions of which may be adjusted by studs 198 having a threaded engagement with the housings 186 and provided with nuts 200 for locking them in adjusted position.

At its forward or right end as viewed in Fig. 5, the mandrel 26 carries an internal die assembly of the type described in detail in United States Letters Patent 2,435,469 to Elston A. Roop, issued February 3, 1948, and including a stationary internal die 202 and a movable internal die 204.

Referring to Figures 1, 2, and 9, the mandrel 26 has an anchoring section 206 at its left hand end as viewed in Figs. 1 and 2, which is secured against axial movement, a locking arm 208 pivotally mounted at 210 in a slot 212 in a block 214 rigidly secured to the frame 22. The arm 208 is pivotable between a locked position (illustrated in Figure 9) in which the arm 208 is received in and closely fits a recess extending transversely of the anchor section 206 of the mandrel 26 and aligned with the slot 212, and an unlocked position in which it is clear of the path of tubing passing over the anchor section 206. A catch 216 is pivotally mounted on the side of the block 214 (Fig. 9) at 218 and a hook portion 220 at one end thereof yieldably urged into latching engagement with the arm 208 for holding the latter in locking position, by a spring 222 acting against the side of the block 214 and the other end of the catch 216. Upon release of the catch 216 the arm 208 is given an initial movement in an unlocking direction by a plunger 221 mounted in the block 214 for vertical movement and urged upwardly by a spring 223. Adjustment of the main part of the mandrel 26 relative to its anchoring section 206, for the purpose of aligning the internal dies 202 and 204 with the external dies 126 and 128 so that the parting plane of the internal dies will coincide with that of the external dies is effected by means of a stud 224 (Figs. 1 and 2) having a hexagonal central portion 226, adapted to be engaged by a suitable wrench, and reversely threaded end portions 228 and 230 threadedly engaging the anchor section 206 and the main part of the mandrel respectively.

Referring to Figs. 5 and 10, the mandrel 26 has a section 232 adjacent the internal dies 202 and 204 in which are provided a plurality of balls 234 urged outwardly by springs 236 to frictionally engage a tube received over the mandrel section 232.

Movement of the external movable die 128 relative to the stationary dies 126 and 202 is effected by a cam follower roller 238 rotatably carried on a post member 240 secured to the disk portion 84 of the sleeve 80 adjacent its outer periphery by screws 242 (see Fig. 5). A cam ring 244 (see Figs. 5 and 11) is secured to the die holder 130 in position to have its outer edge engaged by the cam follower roller 238 during rotation of the sleeve 80. Referring to Fig. 11, the cam ring 244 has a low area between the points 246 and 248. Between the points 248 and 250 the cam has a gradual rise, and between the points 250 and 252 the cam has a relatively pronounced rise, a short dwell and a similarly pronounced fall. Between the point 252 and the point 254 the cam has an extended dwell and then between the points 254 and 256 the cam has a rise, dwell and fall similar to that between the points 250 and 252 but the dwell between points 254 and 256 is slightly higher than the dwell between the points 250 and 252. Between the points 256 and 258 the cam has a second extended dwell at the same height as and similar to the dwell between the points 252 and 254. Between the points 258 and 246 the cam 244 had a third pronounced rise to, and a dwell at, the highest point of the cam and than an abrupt fall to the low area beginning at 246. In the cam ring 244 the high point dwells between 250 and 252, 254 and 256, and 258 and 246, are equiangularly spaced about the cam ring.

The radius of the roller 238 may be varied downwardly from a maximum of substantially equal to the distance from its axis to the low area of the cam ring 244 when that low area is adjacent the roller 238, depending upon the thickness of the tubing to be cut. The size of the roller 238 must, of course, always be sufficient to produce a movement of the die 128 great enough to completely shear through the tubing to be cut, and it will be appreciated that the greater the size of the roller 238, for a given cam 244, the greater the movement of the die 128.

When a roller 238 of any size smaller than the above mentioned maximum is used it will be appreciated that there is a space between the roller and the cam when the low area between the points 246 and 248 is adjacent the roller. When a cutting operation is initiated the roller 238 is rotated about the axis of the sleeve 80, which for the time being is coaxial with the cam 244, and along and from the low area between the points 246 and 248, in a direction toward the point 250 until, because of the gradual rise in the cam between the points 248 and 250, it comes into contact with the edge of the cam. Upon continued rotation the roller 238, as the roller moves to the dwell at the high point between points 250 and 252, the roller moves the cam 244 and hence the die 128 carried in the die holder 130, upon which the cam 244 is mounted to partially shear through the wall of the tubing to be sheared. Upon continued rotation the roller moves around to the high point between the points 254 and 256, in approaching which it moves the cam 244 and the die 128 in a direction spaced angularly about 120 degrees from that in which it moved the die 128 when approaching the high point between the points 250 and 252. The depth of shear effected as the roller moves between the points 254 and 256 is slightly greater than that effected between points 250 and 252 but preferably is not sufficient to shear completely through the tube. The shear is completed as the roller moves beyond the point 258 to the highest point of the cam during which movement the die 128 is cammed in a direction spaced 120 degrees from that in which it was moved at each of the other two high points. Upon continued rotation beyond this highest point of the cam, the roller drops off into the low area between the points 246 and 248. The result of the above described movement of the cam 244 and die holder 130, is the effecting of a greatly improved shearing which provides cut pieces which do not have the highly objectionable burrs resulting from previously known shearing mechanisms.

A brake shoe 260 (see Fig. 12) is pivotally mounted on the supporting plate 72 for movement into engagement with the outer circumference of the disk 84 for stopping rotation of the sleeve 80 when the cam follower roller 238 is in the low area between the points 246 and 248 of the cam 244. Referring to Figures 1, 6 and 12, the brake 260 is applied by a lever 262 pivotally mounted at 264 on the plate 72 and carrying a roller 266 engaging a cam 268 on the shoe 260. The lever 262 is urged in a direction to apply the brake by a spring 270 connected thereto through a housing 272 and links 274 and 276. Within the housing 272 is suitable means, such as a solenoid, for releasing the brake shoe 260. The solenoid is controlled by a conventional switch (not shown) mounted on a bracket 278 (see Fig. 1) and actuated by an arcuate element 280 (see Fig. 6) secured to the outer surface of the clutch 92. The tension of the spring 270 may be adjusted by means of a screw 282, by means of which one end of the spring 270 is connected to a bracket 284 secured to the base 20, the other end of the spring 270 acting on the link 274. The brake pressure may thus be adjusted to insure that after each cutting operation the cam follower roller will come to rest in the low area of the cam between the points 246 and 248.

To adapt the above described machine for the shearing of circular tubing, it is necessary only to replace the mandrel 26 and the dies 126 and 128, with a mandrel and dies of a shape and size corresponding to that of the tubing or pipe to be cut.

While only one specific embodiment of the invention has been illustrated and described in detail herein, it will be readily appreciated by those skilled in the art that numerous modifications and changes may be made without departing from the spirit of the present invention.

What is claimed is:

1. A tube shearing mechanism comprising a base, a stationary die secured to said base, a movable die supported on said base and yieldably held in alignment with said stationary die, and cam means for moving said movable die relative to said stationary die and including a cam supported in fixed relation to one of said dies and a cam follower supported for rotation about the other of said dies, said cam having two high points of a height adapted to cooperate with said follower to move said movable die relative to said stationary die a distance sufficient to shear partially through the wall of a tube received in said mechanism but insufficient to completely shear off a piece of the tube, and another high point angularly spaced from said first named high point and of a height adapted to cooperate with said follower to complete the shearing of the tube, said two high points being of different heights and being angularly spaced about the cam from each other and from said another high point.

2. A tube shearing mechanism as defined in claim 1 wherein said cam has a dwell intermediate said two high points of lower height than either of said two high points.

3. A tube shearing mechanism as defined in claim 1 wherein said cam has a dwell intermediate said two high points of lower height than either of said two high points, and a second dwell intermediate one of said two high points and said another high point and of the same height as said first named dwell.

4. In a tube shearing mechanism including a frame, a pair of external dies mounted on said frame, and a mandrel carrying a pair of internal dies, means for locking said mandrel in adjusted axial position so that the parting plane of the internal dies coincides with that of the external dies and comprising a block adapted to be secured to said frame and having a mandrel opening therethrough, a mandrel anchoring section extending through said opening and adapted to be connected to said mandrel in coaxial relation therewith, said block having a slot extending transversely of said mandrel opening and communicating therewith and said mandrel anchoring section having a transversely extending slot adapted to be aligned with said slot in said block, and means mounted on said block and adapted to move in said slot in said block into and out of said slot in said mandrel anchoring section for securely holding the latter against axial movement.

5. The combination defined in claim 4 wherein said last named means comprises a locking arm pivotally mounted on said block.

6. The combination defined in claim 4 wherein said last named means comprises a locking arm pivotally mounted on said block and including catch means mounted in said block and releasably securing said arm in its locked position.

7. The combination defined in claim 4 wherein said last named means comprises a locking arm pivotally mounted on said block and including catch means mounted in said block and releasably securing said arm in its locked position, and means operative upon release of said catch means for effecting an initial movement of said arm from its locked position.

8. A tube shearing mechanism comprising a base, a stationary die secured to said base, a movable die supported on said base and yieldably held in alignment with said stationary die, and cam means for moving said movable die relative to said stationary die and including a cam supported in fixed relation to one of said dies and a cam follower supported for rotation about the other of said dies, said cam having at least one high point of a height adapted to co-operate with said follower to move said movable die relative to said stationary die a distance sufficient to shear partially through the wall of a tube received in said mechanism but insufficient to completely shear off a piece of the tube, and another high point angularly spaced from said first named high point and of a height adapted to co-operate with said follower to complete the shearing of the tube, said cam follower being supported for rotation about the axis of said stationary die.

9. A tube shearing mechanism comprising a base, a stationary external die mounted on said base, a movable external die, means mounting said movable die on said base and yieldably holding said movable die in a position of alignment with said stationary die, a mandrel, a pair of internal dies carried by said mandrel, means supporting said mandrel on said base and locking it in position with the parting plane of the internal dies coincident with the parting plane of the external dies, said internal and external dies being normally disposed to define a tubular space therebetween having a predetermined thickness measured radially thereof for receiving a tube to be sheared by said mechanism, and cam means operable to move said movable external die transversely of said tubular space in one direction through a distance less than said radial thickness of said space to shear partially but not completely through the wall of a tube received in said space and subsequently move said movable external die transversely of said space in another direction to complete the shearing of said tube, said last named means including a cam coaxial with one of said dies and having points of differing cam height spaced angularly thereabout and a single cam follower successively engaging said points, one of said points controlling the extent of said movement in said one direction and another of said points controlling the extent of said movement in said another direction.

10. A tube shearing mechanism comprising a base, a stationary external die mounted on said base, a movable external die, means mounting said movable die on said base and yieldably holding said movable die in a position of alignment with said stationary die, a mandrel, a pair of internal dies carried by said mandrel, means supporting said mandrel on said base and locking it in position with the parting plane of the internal dies coincident with the parting plane of the external dies, said internal and external dies being normally disposed to define a tubular space therebetween having a predetermined thickness measured radially thereof for receiving a tube to be sheared by said mechanism, and cam means operable to move said movable external die transversely of said tubular space in one direction through a distance less than said radial thickness of said space to shear partially but not completely through the wall of a tube received in said space and subsequently move said movable external die transversely of said space in another direction to complete the shearing of said tube, said last named means including a cam coaxial with one of said dies and having points of differing cam height spaced angularly thereabout and a single cam follower successively engaging said points, one of said points controlling the extent of said movement in said one direction and another of said points controlling the extent of said movement in said another direction, said cam having an extended dwell between said points along which said cam follower moves between said points and of a height such that during said movement of said follower therealong said movable die is in substantial alignment with said stationary die.

References Cited in the file of this patent

UNITED STATES PATENTS

| | | |
|---|---|---|
| 1,717,612 | McNeil | June 18, 1929 |
| 2,397,048 | Roop | Mar. 19, 1946 |
| 2,435,469 | Roop | Feb. 3, 1948 |
| 2,521,974 | Hartup | Sept. 12, 1950 |
| 2,627,921 | Brehm | Feb. 10, 1953 |
| 2,629,439 | Hartup | Feb. 24, 1953 |